(12) United States Patent
Kauffman et al.

(10) Patent No.: US 7,466,980 B2
(45) Date of Patent: Dec. 16, 2008

(54) IN-FLIGHT COMMUNICATIONS SYSTEM

(75) Inventors: Donald C. Kauffman, Laurel, MD (US); Edward Scott Anderson, Snoqualmie, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/557,021

(22) Filed: Nov. 6, 2006

(65) Prior Publication Data

US 2007/0111725 A1 May 17, 2007

Related U.S. Application Data

(63) Continuation of application No. 10/646,925, filed on Aug. 25, 2003, now Pat. No. 7,142,854.

(60) Provisional application No. 60/457,598, filed on Mar. 27, 2003.

(51) Int. Cl.
   *H04Q 7/20* (2006.01)
(52) U.S. Cl. .................... 455/431; 455/427; 455/432.2; 455/410; 455/414.1
(58) Field of Classification Search ............... 455/431, 455/98, 427, 432.2, 410, 414.1, 66; 725/105; 370/316; 701/100
   See application file for complete search history.

(56) References Cited

U.S. PATENT DOCUMENTS

| | | | |
|---|---|---|---|
| 6,201,797 B1* | 3/2001 | Leuca et al. | 370/316 |
| 6,392,692 B1* | 5/2002 | Monroe | 348/143 |
| 2003/0003872 A1* | 1/2003 | Brinkley et al. | 455/66 |
| 2007/0055434 A1* | 3/2007 | Kohlmann | 701/100 |
| 2007/0130599 A1* | 6/2007 | Monroe | 725/105 |

* cited by examiner

*Primary Examiner*—David Q Nguyen
(74) *Attorney, Agent, or Firm*—Ingrassia Fisher & Lorenz, P.C.

(57) ABSTRACT

An in-flight communications system and method suitable for discrete use by, e.g., an Air Marshal, includes a personal digital assistant (PDA) device having wireless communications capabilities, an aircraft cabin wireless local area network (LAN) within which the PDA device can operate, a communications management unit (CMU) associated with the wireless LAN and operable to send and receive data via ACARS, and an operations center operable to receive data that is generated by the PDA, transmitted over the wireless LAN and passed to the operations center via ACARS.

13 Claims, 3 Drawing Sheets

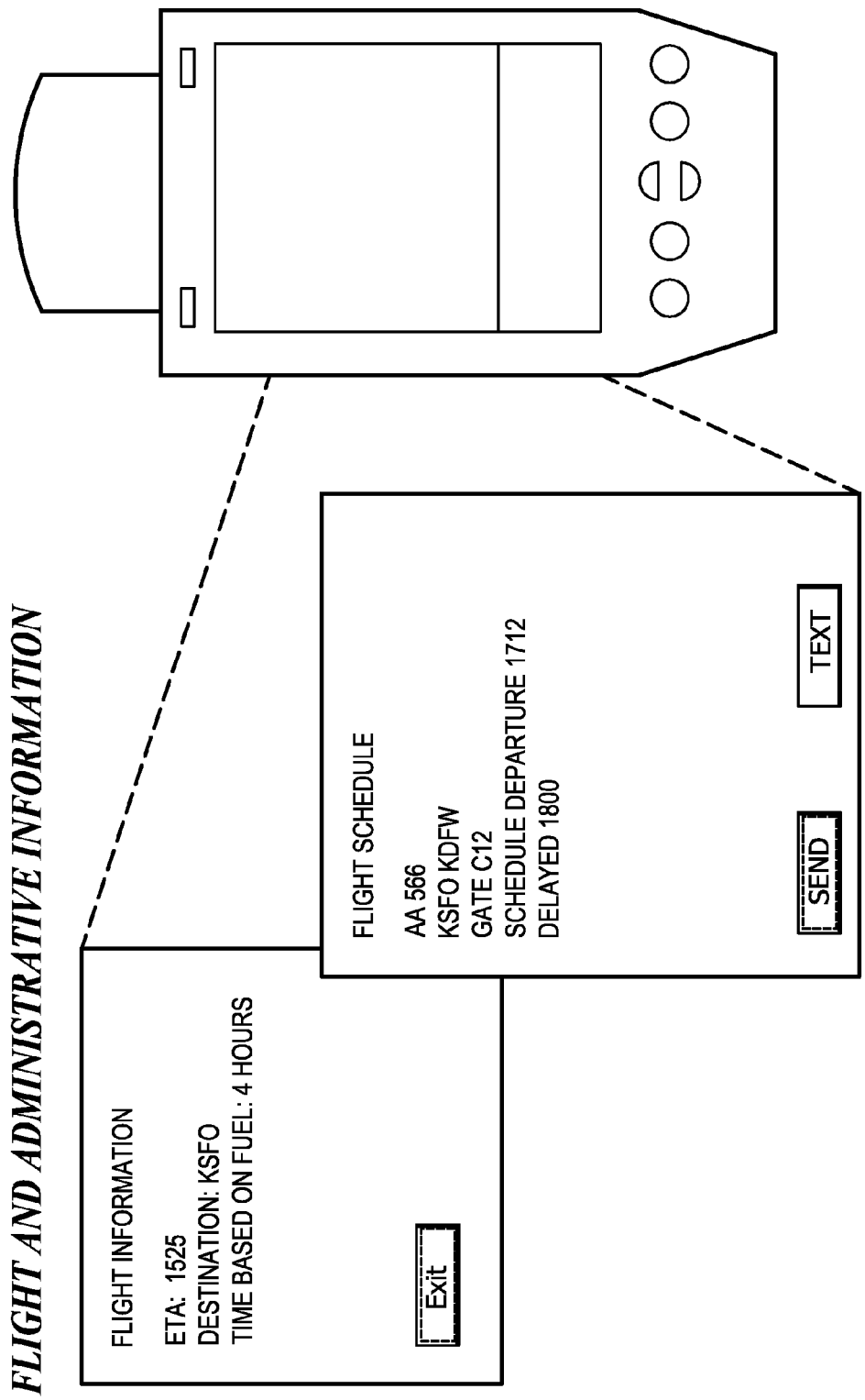

US 7,466,980 B2

IN-FLIGHT COMMUNICATIONS SYSTEM

PRIORITY CLAIM

This application claims the benefit of U.S. Utility application Ser. No. 10/646,925 filed on Aug. 25, 2003, which itself claims priority from U.S. Provisional Application Ser. No. 60/457,598, filed Mar. 27, 2003, both of which are expressly incorporated herein by reference in its entirety.

FIELD OF THE INVENTION

The present invention relates to improvements in communications systems. More particularly, the present invention relates to an in-flight communication system that allows users to send and receive messages in an inconspicuous manner, which is especially desirable for personnel, such as airline security Air Marshals, who expect to remain discrete.

BACKGROUND OF THE INVENTION

In recent years, Air Marshals have become more prevalent on commercial airlines in view of the increased security measures necessitated by the threat of terrorism and general increased desire for public safety. To be effective, Air Marshals should preferably be able to communicate with each other, with the flight deck and/or with their command and control centers on the ground. All of these types of communication should preferably be possible from any seat on the aircraft, or indeed, from virtually any place on the aircraft. Also, any data communication should preferably be transmitted in a secured and covert mode. Heretofore, however, systems have not been fielded that embody these capabilities, let alone in a comprehensive and seamless manner. Accordingly, there remains a need to provide improved in-flight communication capabilities.

SUMMARY OF THE INVENTION

The present invention provides a substantially comprehensive and seamless system for in-flight communications by leveraging existing technology in a manner not previously contemplated. Specifically, the present invention provides a system whereby an Air Marshal, for example, traveling on an air transport aircraft almost anywhere in the world can communicate with ground operations personnel to, e.g., report an onboard incident or receive information from the ground that is critical to his mission. The present invention also enables the Air Marshal to communicate with other Air Marshals that may be onboard the same aircraft, as well as to communicate with the aircraft flight deck officers and the cabin crew. Significantly, the system of the present invention is preferably configured such that the Air Marshal can send and receive messages in an inconspicuous manner, thereby protecting his undercover status.

While the present invention finds particular utility in connection with airline safety and security by providing secure and covert communications capabilities to personnel such as Air Marshals, the present invention can also be used by airlines for operational efficiency. For example, cabin crews can use the system to communicate with their ground operations centers to request cabin maintenance actions or consumable replenishments at a next stop, or request/receive connecting gate information.

In a preferred embodiment, the present invention comprises an Air Marshal terminal, such as a Personal Digital Assistant (PDA) device (e.g., a Palm Pilot) with a wireless modem, a Communication Management Unit (CMU), access to the Aircraft Communications Addressing and Reporting System (ACARS), and a ground host. The ACARS and ground hosts are presently available and well-known to those skilled in the art, and exist on commercial airlines and through service providers such as ARINC. The present invention leverages these facilities by layering thereon secure communications using an encryption scheme that encrypts the data transmissions, and providing a wireless network installed on the aircraft. The wireless network preferably operates in accordance with a commercial standard such as IEEE 802.11(b).

In operation, an Air Marshal, or other user, operates his PDA in a conventional manner, at least to those who may casually see such use. However, in accordance with the present invention, the PDA includes a wireless modem via which the PDA can communicate with the on-board wireless network that operates in conjunction with the CMU, which in turn, is in communication with ACARS, thereby providing ground connectivity, as well connectivity to other similarly-configured PDAs and to flight deck personnel.

The foregoing and other features of the present invention and the attendant advantages thereof will be more fully understood upon reading the following detailed description in conjunction with the accompanying drawings.

BRIEF DESCRIPTION OF THE DRAWINGS

Preferred and alternative embodiments of the present invention are described in detail below with reference to the following drawings:

FIGS. 2 and 3 depict exemplary screen shots of a PDA configured to operate in a communication system in accordance with the present invention.

DETAILED DESCRIPTION OF THE PREFERRED EMBODIMENT

Figure 1:
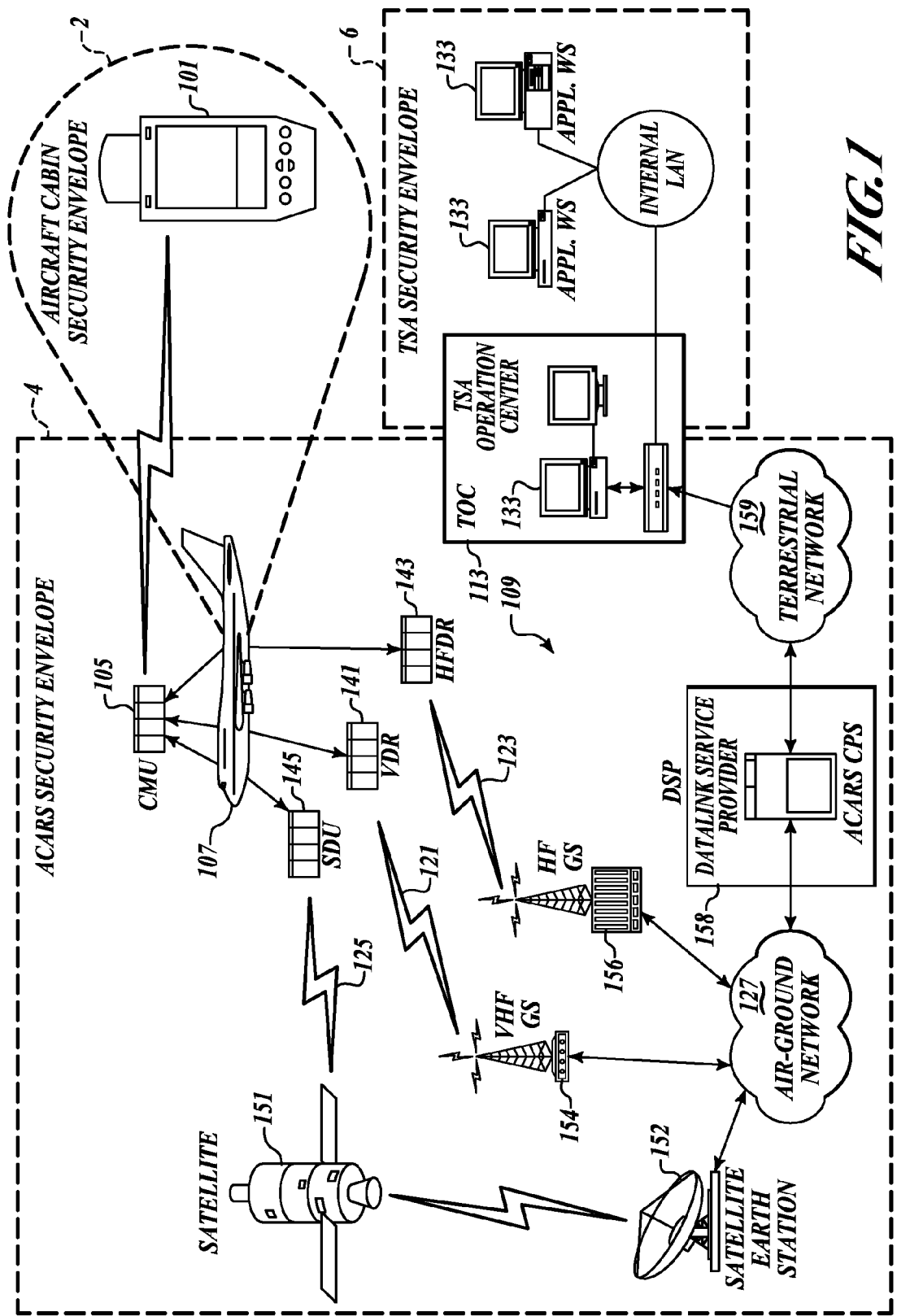
FIG. 1 depicts an exemplary network architecture for implementing a communication system in accordance with the present invention.

Referring to FIG. 1, the present invention preferably comprises an Air Marshal terminal 101, such as a personal digital assistant (PDA) device (such as a Palm Pilot) with a wireless modem, a Communication Management Unit (CMU) 105, part of the Aircraft Communications and Addressing Routing System (ACARS) 109, and a ground host 113. ACARS 109 and ground host 113 are presently available and well-known to those skilled in the art, and exist on commercial airlines and via service providers such as ARINC. The present invention leverages these facilities by layering thereon secure communications using an encryption scheme that encrypts the data transmissions, and providing a wireless network installed on the aircraft. The wireless network preferably operates in accordance with a commercial standard such as IEEE 802.11 (b). Encryption technology is well-known in the art and will not be described herein, except to note that any level of encryption may be implemented that can be supported by the available bandwidth through ACARS/ARINC or any other protocol or service over which data generated by the present invention is carried.

Figure 2:
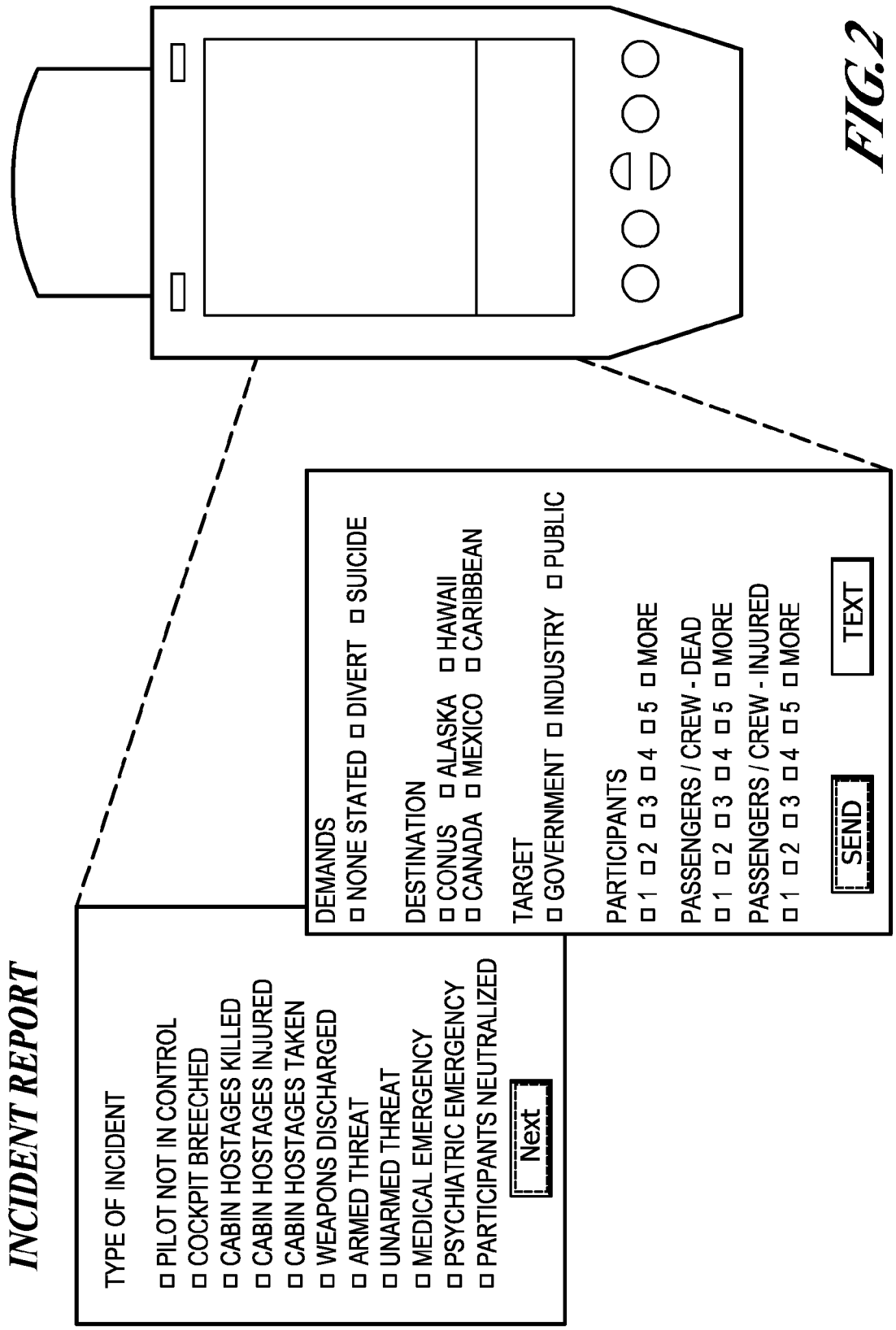

The use of wireless PDA 101 by an Air Marshal allows the officer (or any authorized user) to blend with the other passengers and not call undue attention to himself. Use of wireless PDA device 101 also allows the officer to roam anywhere in the cabin and maintain secure communication links. Using custom drop down menus (examples of which are shown in FIGS. 2 and 3), the officer can quickly send secure communications to the flight deck, other Air Marshals on the aircraft and to his command center, as well as receive secure data from the command center, other Air Marshals, and the pilots. Security for communications is particularly desirable due to the following threats:

ACARS messages are readable while in transit

Messages provide identification, location and time

"Bogus" messages can be transmitted and appear to be legitimate

Valid messages may be altered before delivery

Permits one entity to assume the role of another and engage in communications

Limitations in addressing may result in delivery of message to wrong recipient

Air Marshals communications requirements that are met by the present invention include communications between an Air Marshal and Ground Operations. Such communication might include, for example, information regarding an incident on a given aircraft, or incidents on other aircraft that is relayed to the Air Marshal. The present invention also provides an Air Marshal the ability to communicate with other Air Marshals on the same aircraft, flight deck officers and other cabin crew. Such communication allows for better coordination on responses to onboard situations.

In view of the use of ACARS, the present invention further allows an Air Marshal to have air to ground communication coverage along all, or substantially all, air transport routes. In addition, the system in accordance with the present invention provides inconspicuous operation and "information assurance" in the sense that there is provided Secure (Encrypted) Communications, Authenticated Communications and Message Integrity.

Referring again to FIG. 1, the present invention preferably comprises an electronic system that is composed of both hardware and software. Significant components of the system include:

(1) personal digital assistant (PDA) 101 with a wireless communications transceiver (not shown);

(2) a cabin wireless local area network (LAN) unit (CWLU) (not shown);

(3) a communications management unit (CMU) 105 or communications management function (CMF) software with Secure ACARS and/or ATN Security functionality;

(4) a cockpit display unit and printer (not shown);

(5) at least one of a VHF data link 121, HF data link 123, and/or SATCOM data link 125;

(6) an ACARS, ATN, and/or future aeronautical data link network 109; and (7) a ground system 113 connected to data link network 109, and having at least one display terminal 133. By combining these components as described in more detail below, an Air Marshal can communicate from virtually any location on an aircraft 107 via wireless PDA 101 through an aeronautical data link 109 with worldwide coverage in a secure and inconspicuous manner, thereby protecting the undercover nature of the Air Marshal's mission.

FIG. 1 depicts an exemplary network architecture for implementing a system in accordance with the present invention. At a high level the present invention provides, in one embodiment, an aircraft security envelope 2 that incorporates a wireless LAN that is in communication with an ACARS security envelope 4, which is in turn, in communication with, e.g., a Transportation Safety Administration (TSA) security envelope 6. As shown, the system comprises:

Personal digital assistant (PDA) 101 with the wireless (IEEE 802.11) transceiver. This is a commercially available product that is preferably configured with custom software to manage message entry display pages as well as display information sent from other users within the system. Multiple PDAs 101 can be used in the system for other users such as other Air Marshals and the cabin crew.

(2) Cabin wireless local area network (LAN) unit (CWLU) serves as an access point for wireless (IEEE 802.11) transmissions and converts them into, e.g., an Ethernet format, which is the interface into the communications management unit (CMU) 105.

(3) CMU 105 preferably includes Secure ACARS software and/or ATN Security software and is preferably integrated with a basic CMU that further includes the capability of providing data security for all air-to-ground data link messages. The Secure ACARS software preferably provides, using known techniques, the security services of confidentiality (encryption), data authentication, and data integrity. Those skilled in the art will appreciate that a CMU is not critical to the present invention and is used herein only to show an exemplary implementation. For example, communications systems are presently being fielded that do not necessarily rely on the functionality of a CMU. For instance, a direct satellite link is one type of system that might bypass the CMU. Similarly, an airphone system that communicates directly with ground stations (and bypasses a CMU) could also be employed in connection with the present invention.

(4) In a preferred implementation, CMU 105 interfaces to cockpit displays and printers which serve as communication terminals for the flight deck officers, as well as to a VHF data link radio (VDR) 141, HF data link radio (HFDR) 143, and SATCOM data unit (SDU) 145 to provide connectivity to the ACARS, ATN, or future aeronautical data links.

(5) A satellite 151, Satellite Earth Station 152, VHF Ground Stations (GS) 154, HF Ground Stations 156, air-ground network 127, a data link service provider ACARS Central Processing System (CPS) 158 and a terrestrial network 159 constitute a typical data link network that provides digital message communications capability between aircraft 107 and ground users.

(6) Ground host/TSA Operation Center 113 preferably has peer Secure ACARS software to provide the complementary data security service as performed in CMU 105 with Secure ACARS.

(7) Finally, computer workstations 133 along with TSA Operations Center 113 permit ground personnel to send and receive communications to and from the airborne Air Marshals.

Since the Air Marshal is provided a Communications Terminal that is preferably in the form of a wireless PDA, the Air Marshal can easily roam throughout the aircraft cabin and maintain a communications link. Such a PDA further allows the Air Marshal to blend into the passenger population, since the "terminal" looks like a typical passenger's possession. Such a terminal further enables the Air Marshal to receive and transmit easily with minimal interaction or data entry. In other words, PDA 101, as used in the context of the present invention, gives an Air Marshal anonymity and roaming, both of which are significant components of mission success.

FIGS. 2 and 3 are exemplary screen shots of possible displays that can be presented to an Air Marshal on his PDA. FIG. 2 depicts exemplary screens that are particularly suited to Air Marshal duties. These screens list types of incidents and other information about evolving emergency scenarios. In a preferred implementation, the screens are advantageously arranged to require only simple tap and click functionality, thereby freeing the Air Marshal from excess work.

FIG. 3 depicts exemplary screen shots that could be presented on PDA 101 when the system of the present invention is used to augment or enhance existing flight operations capabilities. In the case shown in FIG. 3, the screens show flight information and flight schedule information provided, e.g., by a particular airline.

As those skilled in the art will appreciate, there are tradeoffs in selecting the type of terminal that an Air Marshal might use. There are two basic choices: Data (e.g., a PDA) or Voice.

The following characteristics are associated with a PDA (Data Communication):
  Preformatted data entry screens allows for quick and complete standard messages
  Ability to uplink and downlink messages and graphics
  Multiplex use of existing aircraft data link equipment
  Worldwide coverage
  Ground system required at headquarters for messaging The following characteristics are associated with Voice Communication:
  Not as discrete as text messaging
  Easily overheard—Draws attention to Air Marshal
  Unable to graphically convey the situation
  Requires a dedicated voice channel from aircraft
  Additional radio and antenna on aircraft
  Additional spectrum/frequency allocation
  Additional ground stations In view of the foregoing, the present invention is preferably based on data-type communication. However, to the extent voice communications can be kept discrete and be operated without significant aircraft or communication facilities modifications like those mentioned above, the present invention can also be augmented to support speech capabilities. Further, in view of the use of a PDA, wireless airborne network and air-to-ground connectivity consistent with the principles of the present invention, information assurance is provided in the forms of:
  Data Authentication—Provides strong authentication of the terrestrial and airborne communicating peer entities
  Data Integrity—Provides end-to-end data integrity for the payload in uplink and downlink messages
  Confidentiality—Provides end-to-end data confidentiality for the payload in uplink and downlink messages Likewise, the present invention provides cryptographic strength by preferably implementing cryptographic algorithms and key length(s) suitable for protecting civilian "For Official Use Only" (FOUO) and military "Sensitive-But-Unclassified" (SBU) data.

With reference to FIG. 1, the flow of a typical Air Marshal communication message is as follows:
  Message Uplink
  Ground user composes message to aircraft
  Secure ACARS Ground System protects message at TSA Operations Center
  Protected message transits terrestrial networks to ACARS Data Link Service Provider
  Protected message transits DSP ground—ground and air-ground networks to aircraft
  CMU authenticates ground user, decrypts message, forwards to Air Marshal via protected IEEE 802.11 message, and displays message on flight deck Multi-function Control and Display Unit (MCDU), if authorized
  PDA or any other portable device receives, via CMU 105, IEEE 802.11 message and decrypts for user
  PDA or other portable device alarms/notifies user of incoming message
  Message Downlink
  Air Marshal composes message on PDA using predefined message structure or free text entries
  PDA transmits protected IEEE 802.11 message to CMU
  CMU encrypts message, transmits message via ACARS network, and displays message on flight deck Multi-function Control and Display Unit (MCDU), if authorized
  Protected message transits ACARS air—ground and ground—ground networks to DSP
  DSP forwards protected message to TSA Operations Center via ground—ground network
  Operations Center authenticates Air Marshal and decrypts message Those skilled in the art will appreciate that while the function of encrypting and decrypting is performed by the CMU, the PDA device itself could also perform these functions as long as the appropriate keys and processing power were available to the device.

In view of the architecture and components employed in a system in accordance with the present invention, it is possible to significantly, if not completely, eliminate the following threats that Air Marshals and their colleagues face:
  Disclosure—Messages are readable while in transit
  Traffic Analysis—Messages provide identification, location, and time
  Spoofing—Bogus messages can be transmitted and appear to be legitimate
  Modification—Valid messages may be altered before delivery
  Masquerade—Permits one entity to assume the role of another entity and engage in communications
  Mis-delivery—Limitations in addressing may result in delivery of messages to wrong recipient The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An in-flight communications system for securely transmitting information between a personal digital assistant (PDA) onboard an aircraft and a ground-based operations center, the system comprising:
  an aircraft cabin security envelope including a wireless LAN that is in wireless communication with the PDA;

an airborne communications management unit (CMU) in operable communication with the wireless LAN and configured to transmit a first message to the ground-based operations center, wherein the first message is generated by the PDA and is encrypted;

an ACARS security envelope that is in communication with the wireless LAN via the CMU; and a ground-based security envelope including the ground-based operations center that is in communication with the ACARS security envelope, wherein the ground-based operations center is configured to receive and decrypt the first message from the CMU.

2. The system of claim 1, wherein the wireless LAN supports a plurality of wireless devices.

3. The system of claim 1, wherein the ACARS security envelope comprises a datalinik service provided that is linked to the ground based security envelope.

4. The system of claim 1, wherein an authorized user operates within the aircraft cabin security envelope.

5. The system of claim 4, wherein the authorized user utilizes the PDA to communicate with the ground-based operations center.

6. The system of claim 4, wherein the authorized user utilizes the PDA to communicate with flight deck personnel on the same aircraft.

7. The system of claim 4, wherein the authorized user utilizes the PDA to communicate with another authorized user on the same aircraft.

8. The system of claim 1, wherein the first message is encrypted by the CMU.

9. The system of claim 8, wherein:

the ground-based operations center is further configured to transmit an encrypted second message to the CMU via the ACARS security envelope; and the CMU is further configured to:

receive the encrypted second message from the ground-based operations center;

decrypt the encrypted second message; and transmit the decrypted second message to the PDA via the wireless LAN.

10. The system of claim 1, wherein the first message is encrypted by the PDA.

11. An in-flight communications system for securely transmitting information between a personal digital assistant (PDA) onboard an aircraft and a ground-based operations center, the system comprising:

an aircraft cabin security envelope including a wireless LAN that is in wireless communication with the PDA, wherein the PDA is configured to generate and transmit a plurality of predetermined descriptive messages;

an airborne communications management unit (CMU) that is in operable communication with the wireless LAN and configured to transmit a first predetermined descriptive message to the ground-based operations center; wherein the first predetermined descriptive message is generated by the PDA and is encrypted;

an ACARS security envelope that is in communication with the wireless LAN via the CMU; and a ground-based security envelope including the ground-based station that is in communication with the ACARS security envelope, wherein the ground-based station is configured to receive and decrypt the first predetermined descriptive message from the CMU.

12. The system of claim 11, wherein the first predetermined descriptive message is encrypted by the CMU.

13. The system of claim 11, wherein the first predetermined descriptive message is encrypted by the PDA.

* * * * *